No. 834,718. PATENTED OCT. 30, 1906.
D. GENESE.
COMPOSITION OF MATTER AND METHOD OF MAKING SAME.
APPLICATION FILED JAN. 20, 1906.
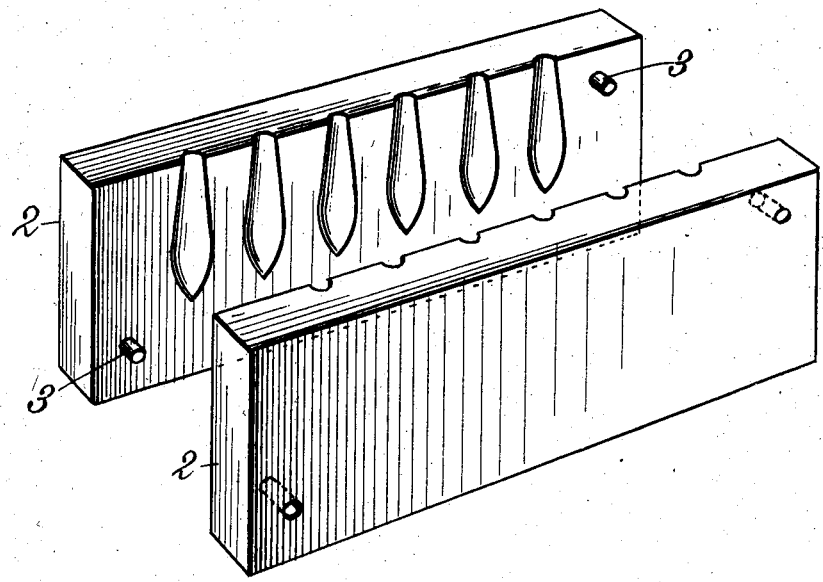
Witnesses.
Inventor.
David Genese.
By James L. Norris,
Att'y.

UNITED STATES PATENT OFFICE.

DAVID GENESE, OF BALTIMORE, MARYLAND.

COMPOSITION OF MATTER AND METHOD OF MAKING SAME.

No. 834,718.     Specification of Letters Patent.     Patented Oct. 30, 1906.

Application filed January 20, 1906. Serial No. 296,984.

*To all whom it may concern:*

Be it known that I, DAVID GENESE, a citizen of the United States, residing at Baltimore, in the State of Maryland, have invented new and useful Improvements in the Composition of Matter and Method of Making Same, of which the following is a specification.

This invention relates to a composition of matter and to a method of making the same. The composition may be employed with advantage for several different purposes—such as a suppository-mold, a box for ointment, and a surgical splint or bandage. In making the composition I take a desired quantity of plaster-of-paris and put the same into a receptacle of water and allow the plaster to settle in the water. The water is then poured off. It is not necessary to heat the water, for I find I can make the composition satisfactorily by using the water at ordinary temperatures. With the saturated mass of plaster I mix gluten of rice, using a sufficient quantity of the latter ingredient to produce a thick mass. I do not make the mixture so thick, however, that it cannot be poured. By mixing the rice gluten with the saturated plaster I assure the adherence of the plaster atoms together and avoid porosity, which is always present with objects made simply of plaster. The mixture sets very rapidly and is very dense. The mass after being suitably dried, as by hot air, is steeped in a bath of white wax or equivalent material to thoroughly coat it and make it impervious to fluids.

Hereinbefore I have stated various articles which can be satisfactorily made from a composition made in accordance with the invention. One of these is a mold for suppositories, and in the drawing in perspective I have shown such a mold.

In a contemporaneously-pending application, Serial No. 296,983, filed January 20, 1906, I have shown a mold for casting a composite mold made in accordance with the present invention. After mixing the materials in the manner hereinbefore stated to produce a fluid mass I pour the fluid mass into a mold such as that disclosed by the application referred to, and when the material has been set, and this I find results in about five minutes, the suppository-mold can be removed from the forming-mold.

In a mold involving the present invention I can pour the glycerin mass while hot thereinto, and the glycerin mass will take the proper suppository shape without shrinkage and without any possibility of contamination, as would be the case with a metallic mold. The simplicity and inexpensiveness of a composite mold will permit a manufacturer to have many hundred sets, as these will cost but a small percentage of what the metallic ones would. A glycerin mass in the composite mold can remain therein for an indefinite period without deterioration or liquefaction. The composite mold is a non-conductor of heat or cold and preserves intact the glycerin mass therein from discoloration. It can be washed freely in hot or cold water without injury to its fine edges. It is very much lighter than a metallic mold. It can be filled with exactness and can be worked without possibility of fracture or breakage in lathes and by tools.

The composition can be used with advantage as a splint or bandage in surgical work, as it does not set as quickly as plaster, so that a physician or surgeon can adjust a bandage or splint made up from the composition in an accurate manner to any part of the body; yet when set it has strength enough to resist breakage. It can be used as a receptacle for ointments or medicines without possibility of the latter being affected by contact with the composition.

I may make the rice gluten by putting it in a mixture of alcohol and water and subjecting the three ingredients to a sufficient amount of heat for a sufficient length of time as to thoroughly involve and dissolve the rice to form a semifluid mixture, which is the mixture that is associated with the saturated plaster. This is one way of producing the rice gluten in semifluid form for association with the plaster. I may obtain the rice gluten by the following procedure: Rice after having been slightly dampened is inclosed in a tight vessel large enough to allow slight expansion. The mass is then subjected to high steam heat for some time. The vessel is lined with porcelain or other suitable material. In this way the vessel cannot be attacked by the nitric acid which I add to convert the substance into a glutinous mass. When the mass is thoroughly cured, I beat the same into a thin condition by the addition of alcohol reduced to fifty and reheat the material in bulk in a steam-jacketed receptacle to form the fluid gluten mass. This fluid mass will mix readily with plaster or equivalent material.

The mold shown in the drawing is composed of duplicate sections, each designated by 2 and one of which may have dowel-pins, as 3, to fit holes or openings in the other to hold the two sections with their cavities in registering relation. When the cavities in the mold halves or sections are in register, there will be produced longitudinally of the mold a series of separated chambers into which the glycerin mass to which I have referred is poured.

What I claim is—

1. A composition of matter including plaster and rice gluten in fluid condition.

2. A composition of matter including plaster and rice gluten, combined with a waterproof covering for the composition.

3. A method consisting of immersing plaster in water; pouring off the water from the plaster to leave a saturated mass of plaster; and mixing with the saturated plaster a mass of rice gluten in fluid condition.

4. A mold made up of plaster and rice gluten in fluid condition.

In testimony whereof I have hereunto set my hand in presence of two subscribing witnesses.

DAVID GENESE.

Witnesses:
EDWARD WOODALL,
GEO. CAREY LINDSAY.